United States Patent [19]

Fay, III et al.

[11] Patent Number: 4,834,774

[45] Date of Patent: May 30, 1989

[54] CHARCOAL FUEL ARTICLE

[75] Inventors: James E. Fay, III; Frederick J. Hrubecky, both of Winnebago County; Doris A. Mills, Outagamie County; Carl J. Gierke; Wilbert Heikkinen, both of Winnebago County, all of Wis.; Rory D. Williams, Cuyahoga County, Ohio; James I. Lang, Brown County, Wis.

[73] Assignee: Kimberly-Clark Corporation, Neenah, Wis.

[21] Appl. No.: 3,680

[22] Filed: Jan. 15, 1987

[51] Int. Cl.$^4$ .......................... C10L 5/36; C10L 11/00
[52] U.S. Cl. .......................................... 44/14; 44/520; 44/522; 44/532
[58] Field of Search ................. 44/14, 34, 38, 41, 520, 44/521, 522, 532

[56] References Cited

U.S. PATENT DOCUMENTS 2,578,998  12/1951  Fracheboud ............................ 44/38

FOREIGN PATENT DOCUMENTS

| 123 | of 1874 | United Kingdom | 44/34 |
| 9906 | of 1889 | United Kingdom | 44/34 C |
| 397568 | 8/1933 | United Kingdom | 44/38 |

*Primary Examiner*—Carl F. Dees
*Attorney, Agent, or Firm*—Donald L. Traut

[57] ABSTRACT

Novel, and improved fuel articles having a plurality of novel characteristics and having a typical mass density of 0.6 to 1.2 g/cc and a bulk density of 0.2 to 0.4 times the mass density. The greatest distance dg from a point in the fuel article to the nearest point on the nearest one of the upstanding walls is between 0.15 and 0.60 times the height of the fuel article. Charcoal fuel articles of the invention ignite faster than conventional pillow-shaped charcoal fuel articles and deliver substantially more usable cooking heat flux to the cooking surface of a standard charcoal cooker than do conventional pillow-shaped briquettes. The coal article may have a central body portion having a minor circumference, a plurality of fingers projecting from the central body portion, and a hole in the central body portion. The fingers may have finger ends wherein the ratio of the major circumference defined by the finger ends to the minor circumference is at least about 1.25:1. Preferred ratio of surface area to volume of the fuel articles of the invention is between 2.5:1 and 7.0:1. The fuel articles of the invention have a plurality of intersecting walls, which desirably intersect at sharp angles. The invention further includes novel methods of making the fuel articles disclosed herein, and novel methods of cooking using them.

68 Claims, 2 Drawing Sheets

CHARCOAL FUEL ARTICLE

BACKGROUND OF THE INVENTION

This invention pertains to charcoal fuel articles, and particularly those articles which are used for cooking food.

Charcoal fuel, for consumer use, is conventionally available in the form of pillow-shaped briquettes. These briquettes are formed in a molding operation which leaves the briquettes in the shape of a pillow, and yields a molded briquette surface which is relatively smooth. The edges of a conventional briquette may appear broken and irregular.

Conventional charcoal briquettes are typically used in charcoal cookers which are made specifically for that purpose. A standard charcoal cooker is a bowl shaped metal container approximately 18 to 22 inches in diameter having a fairly tight fitting bowl shaped lid, such that the closed cooker, in the use configuration, appears as more or less of a sphere. The lower receptacle portion of the cooker has a plurality of holes near its bottom to provide for incoming combustion air. Inside the receptacle, and above the holes, is a combustion grate, for holding charcoal fuel. Above the combustion grate is the cooking grate, at approximately the top of the receptacle portion of the cooker for holding food. Both the combustion grate and the cooking grate are removable. The lid portion of the cooker has a plurality of holes for venting hot gases from the cooker, with closure means for partially or totally closing the vent holes.

It is well known that, in order to ignite charcoal in a standard charcoal cooker, a substantial amount of heat must be applied to the charcoal; substantially more heat than is generated by a match. Typically charcoal is ignited by the use of an electric starter or by the application of a lighter fluid. Since the use of lighter fluid is the most common means of igniting conventional charcoal, the use of lighter fluid will be described herein with the understanding that similar discussion of other means of igniting conventional charcoal applies.

Typically, a mass of charcoal briquettes is arranged in a random stack in the charcoal cooker, and lighter fluid is applied from the lighter fluid container. One typically recommended amount of material for use is the combination of 4 lbs. of charcoal briquettes and 4 ounces of lighter fluid.

Typical problems encountered with conventional charcoal briquettes pertain mostly to the ignition phase. One of these problems is that the compacted, molded surface of the briquette is less porous than the body of the briquette, as a whole, and impedes the body of the charcoal briquette from absorbing the lighter fluid as quickly as desired. Thus, the user will observe the rate of absorption of fluid and adjust the rate of application of lighter fluid accordingly, lest the fluid run off the surface of the briquettes and be spilled to the bottom of the cooker, where it is not so efficiently used.

After the lighter fluid has been applied to the random stack of briquettes, the stack is ignited with a match. The match ignition ignites the lighter fluid in and on the briquettes. The lighter fluid burns with a substantially yellow flame. As it burns, the heat from its burning raises the temperature of the charcoal briquettes. As the temperature of the charcoal rises, the charcoal itself is ignited and burns, substantially without flame, but with a radiant glow accompanied with a surface covering of ash, which appears shortly after the ignition of the charcoal. By the time the lighter fluid has been consumed, the charcoal should be fully capable of sustaining combustion.

For purposes of this description, there are three phases to the process of igniting charcoal. The first phase is the ignition and burning of the lighter fluid, which is characterized by a typically yellow flame. The second phase begins when combustion of the charcoal becomes self-sustaining. The third and final phase of ignition is reached when heat flux received at the cooking surface reaches an amount sufficient for cooking food. As used herein, heat usable and adequate for cooking food means an instantaneous heat flux of at least about 1500 $Btu/ft^2$-hr for slow simmering and at least about 3000 $Btu/ft^2$-hr for quick frying received at the cooking surface when the igniting charcoal has been spread out in the cooking configuration.

It is highly desirable that the self-sustaining burning of the charcoal (phase 2) begin before the lighter fluid is completely consumed in phase 1 of the ignition, to ensure continuity of ignition. If the lighter fluid is all consumed before self-sustaining burning is achieved, the ignition sequence falters and a sustained burn is not achieved. With conventional charcoal briquettes, there is substantial difficulty in consistently achieving a self-sustaining burning of charcoal with every ignition without use of an inordinate amount of lighter fluid.

If too much lighter fluid is used, then cooking of food may be delayed to allow for burning off of the excess lighter fluid before cooking of food is begun. It is not particularly desirable to cook food before the lighter fluid has been all consumed, as the lighter fluid itself, and the fumes from burning it, are not particularly advantageous for use in cooking food. Once the charcoal has been adequately ignited to provide heat adequate for cooking food, the stack of charcoal is typically spread out to generally cover the combustion grate for the cooking process. Another problem with conventional charcoal briquettes is that a larger amount of charcoal than is needed for the cooking phase (phase 3) is typically used in order to ensure a successful ignition. In addition to being wasteful of the charcoal, the heat output from this larger amount may be so great as to burn the food.

A significant problem with conventional charcoal is that the ignition may be incomplete by the time the lighter fluid has all been consumed. In this event, additional lighter fluid may be added to the partially ignited stack of briquettes, whereby a dangerous flash fire may arise from the partially ignited stack of briquettes as the lighter fluid is being added. This has, of course, the potential risk of causing flame burns to the user.

Typical ignition time for conventional charcoal briquettes to generate enough heat to cook is on the order of 20 to 30 minutes. This time may vary substantially, depending on the number and severity of problems encountered in igniting the charcoal.

One solution that has been commercialized is to impregnate the charcoal with lighter fluid when it is manufactured; and to sell it as an impregnated fuel, not requiring the use of additional lighter fluid. This approach to the problem does provide a partial solution, but it also presents some difficulties. Since the lighter fluid is flammable and vaporizable, the packaging must be substantially vapor impermeable in order to contain the impregnated fluid. Even if the package is vapor impermeable, when the package is opened, a substantial amount of vapor is released to the atmosphere. Further, the impregnated briquettes should not be enclosed in a hot grill for any period of time without air, as a flash fire may erupt when the hot cooker is opened and air is admitted. In addition, since the lighter fluid is uniformly impregnated into the briquettes, it does not completely burn off before the cooking phase starts, but rather is present for a substantial period of the cooking phase. The presence of the lighter fluid during the cooking phase results in lighter fluid vapors and combustion gases from the lighter fluid being in contact with the food. This is detrimental both from the standpoint of taste and possible undesirable chemicals.

It is an object of this invention to provide an improved charcoal fuel article which ignites more easily, and reaches cooking temperature more quickly, than conventional charcoal fuel articles.

It is another object of the invention to provide a charcoal fuel article which, pound for pound, delivers to the cooking grate more heat usable and adequate for cooking food.

It is yet another object of the invention to provide a charcoal fuel article which has greater surface porosity.

SUMMARY OF THE INVENTION

The charcoal fuel articles of this invention are seen to have a plurality of novel features and characteristics. The charcoal fuel articles of this invention have a mass density of about 0.6 g/cc to about 1.2 g/cc, preferably about 0.7 to about 0.85 g/cc, and most preferably about 0.73 to about 0.76 g/cc, in combination with a bulk density of about 0.2 to about 0.4 times the mass density and preferably about 0.3 to about 0.35 times mass density.

Further, the charcoal fuel articles of this invention have, in combination, a height, h, and substantially upstanding walls, each article having a hole through it, the hole itself being defined by substantially upstanding walls, the charcoal fuel article having a height to cross-section diameter ratio of no more than about 1:1; and the greatest distance, dg, from a point in the fuel article to the nearest point on the nearest upstanding walls ranging from about 0.15 h to about 0.60 h.

Still further, the charcoal fuel articles of this invention have, in combination, a height to cross-section ratio of less than about 1:1 and a hole through the article, the hole being defined by substantially upstanding walls. A feature of the articles of the invention is that a given mass of the fuel articles is capable of delivering substantially more usable cooking heat flux to the cooking surface of the standard charcoal cooker than an equivalent mass of standard pillow-shaped charcoal briquettes having the same composition.

Further, the charcoal fuel articles of the invention have, in combination, a height to cross-section ratio of less than about 1:1 and, when compared to standard charcoal briquettes of the same composition, the fuel articles of the invention reach cooking output of heat flux, as measured at the cooking surface during the ignition phase, substantially sooner than an equivalent mass of the conventional pillow-shaped charcoal briquettes.

Still further, the charcoal fuel articles of the invention have a normal orientation position, and in that position, the vertical projection of a single layer of the articles positioned in close formation together is at least about 5% void, and preferably about 10% void, most preferably about 12 to about 16% void, but not over 20% void, and most preferably including a hole through each of the charcoal fuel articles as part of that void amount.

The charcoal fuel articles of the invention may be defined geometrically, and with respect to orientation. The articles typically have a normal orientation position and a height to cross-section ratio in that normal position of less than 1. The article comprises a central body portion having a minor circumference. A plurality of fingers project from the central body portion. A hole passes through the central body portion and extends upwardly through it when the fuel article is in its normal position. The fingers may have finger ends which define a major circumference, wherein the ratio of the major circumference to the minor circumference is at least about 1.25:1 to about 2.3:1, and preferably is at least about 1.5:1 to about 2.0:1, and most preferably about 1.6:1 to about 1.8:1. In the preferred embodiment, when a single layer of the articles is positioned in close formation together, substantial fractions of the perimeters of the articles are in substantial surface-to-surface proximity with each other along substantially nested adjacent surfaces thereof.

Another way of defining the charcoal fuel articles of the invention is that they have a ratio of surface area to volume of between about 2.5:1 and about 7.0:1, and preferably about 3:1 to about 6:1, and most preferably about 3.5:1 to about 5:1.

Still another way of defining the charcoal fuel articles of the invention is that each article comprises a pair of surfaces on opposing sides of the article, and connecting walls between the pair of surfaces and intersecting that pair of surfaces at sharp angles. It is desirable, though not critical, that at least one of the walls have at least one substantially straight line dimension. It is preferred that the pair of surfaces have a selected surface porosity and the connecting walls have substantially less porosity than the pair of surfaces.

Preferably the pair of surfaces are more porous and irregular than the pillow-shaped surfaces of standard charcoal briquettes. Typically this pair of surfaces have been made by a separation-type process, rather than the compaction-molding process.

The invention is further described and defined in a method of cooking with charcoal fuel articles which have two generally planar surfaces and connecting walls between those surfaces. The connecting walls intersect the generally planar surfaces at sharp angles. The first step in the novel method of the invention comprises the steps of arranging an appropriate quantity of the fuel in a random stack and igniting it. The second step is arranging the ignited fuel articles in a single layer. The third step is orienting the ignited fuel articles such that the generally parallel planar surfaces of the article are in a generally horizontal plane. Finally, the fourth step is cooking food over that single layer of oriented, ignited fuel articles. The novel method of cooking may also include the step of separating the fuel articles to a spaced apart configuration before cooking food over them, such that the food is cooked over a single layer of ignited oriented and separated fuel articles.

DETAILED DESCRIPTION OF THE ILLUSTRATED EMBODIMENT

Figures 1, 1A:
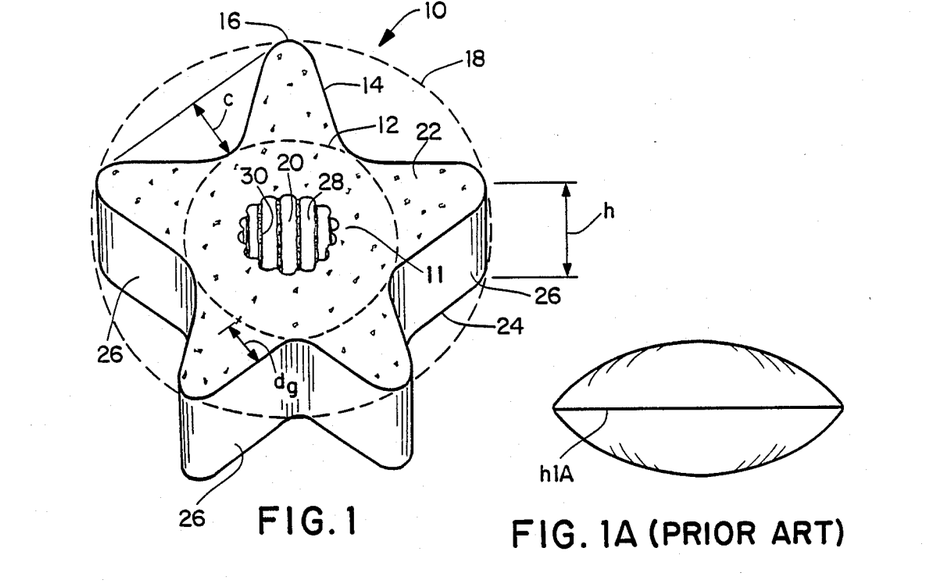
FIG. 1 is a pictorial view of a typical charcoal fuel article of the invention.
FIG. 1A is a side view of a conventional pillow-shaped charcoal fuel article of the Prior Art.

FIG. 1 shows a charcoal fuel article 10 of the invention in pictorial view. The article is in the shape of a star having a central body portion 11. The outer perimeter of the central body portion is generally defined by the illustrative dashed line 12, which is shown for illustration purposes only. Dashed outline 12 is also usefully defined as the minor circumference of the fuel articles of the invention. A plurality of fingers 14 project from the central body portion and terminate in finger ends 16 which define a major circumference 18 which connects finger ends 16. Major circumference 18 is shown in dashed outline for illustration purposes only. A hole 20 extends through the fuel article 10, and preferably through the central body portion 11. The fuel article has a top wall 22, a bottom wall 24 and a plurality of connecting side walls 26. The side walls 26 are typically perpendicular to top and bottom walls 22 and 24 respectively. Sidewalls 26 preferably have significant uninterrupted surface area, which may be useful as a surface source of radiant heat energy, particularly as a radiation surface directing heat energy toward a similarly shaped surface on an adjacent fuel article.

The planes of the top and bottom walls 22 and 24 typically are approximately parallel to each other. The manufacturing process, however, is typically imprecise in formation of the article dimensions and angles, so substantial variations in the dimensions and the angles of the intersection are normal. Hole 20 includes a plurality of channels 28 and ridges 30.

In the charcoal fuel articles of the invention, the surface area of the fuel articles is increased over that of a standard pillow-shaped briquette, or a disk-shaped article, by the inclusion of the finger projections about the perimeter of the articles. The surface area, and the proximate surface area permitted thereby between the articles during the ignition phase, are further enhanced by the inclusion of the hole 20. While the hole is not critical to the primary functioning of the articles, and while the articles of the invention which do not include the hole are improved over conventional briquettes, the hole is included as a preferred embodiment. In the preferred embodiment, the hole has a plurality of channels and ridges, further contributing to the surface area. The fact that the portions of the wall surrounding the hole are generally facing other portions of the surrounding wall enables the radiant energy from a hole wall surface in the hole to be radiated to an opposing surface and thereby contribute to raising the temperature of that opposing surface and facilitating its ignition. The narrow projections of ridges 30 are more readily ignited than, for example, channels 28, because of geometric heat concentration, as are the ends 16 of fingers 14.

The fuel articles of the illustrated embodiment may be characterized as having a mass density, md, of about 0.6 g/cc to about 1.2 g/cc, preferably about 0.7 g/cc to about 0.85 g/cc, and most preferably about 0.73 g/cc to about 0.76 g/cc, and, in combination, a bulk density of about 0.2 g/cc to about 0.4 g/cc, and preferably about 0.25 g/cc to about 0.35 g/cc, and most preferably about 0.26 g/cc to about 0.33 g/cc.

Figure 3:
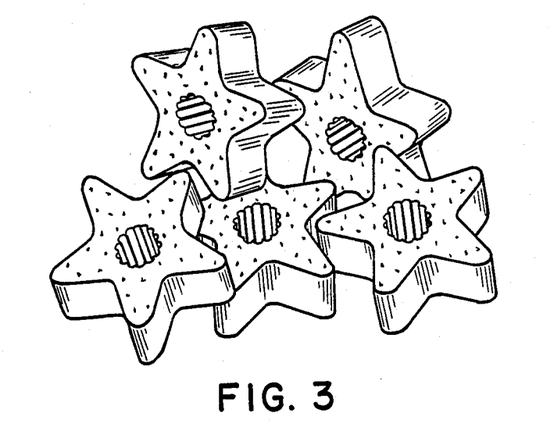
FIG. 3 is a pictorial representation of a random stack of articles of the invention.

During the ignition phase of burning charcoal fuel articles of the invention, it is preferred that the fuel articles be arranged in a relatively loose random stack, such that air can circulate relatively freely to the surfaces in the stack, as seen in FIG. 3. Such a stack is made by arranging the fuel articles relatively close together, with necessary amounts of touching, and in such a way that the stack is relatively stable. The fuel articles are treated with some ignition mechanism such as a lighter fluid in order to facilitate raising the temperature of the fuel articles to the point where the charcoal itself is ignited. In such a stack, the surfaces of the fuel articles of the invention contribute substantially to each other in providing heat, mostly radiant heat, to adjacent surfaces, which is beneficial for mutually raising the temperature of the effected surfaces, and thereby facilitating ignition. The articles of the invention, by virtue of their shape, maintain such distance between them in a random stack that substantial quantities of air are freely available to a major fraction of the surfaces which are susceptible to the ignition for burning.

The surfaces of the star fingers are generally straight in one dimension, though they may be curved in other dimensions, such that radiant benefits may be experienced by adjacent fingers or top and bottom surfaces, of adjacent stars. In conventional pillow-shaped articles, the rounded pillow surfaces do not lend themselves to stacking in such a way that air can circulate relatively freely to the fuel surfaces. Rather, the pillow surfaces tend to nest vertically, when piled, impeding the beneficial flow of air. Ignition of the charcoal is evidenced by a radiant glow of the surface of the charcoal, and is shortly accompanied by an accumulation of a light grey ash on the burning surface. It is seen, in the fuel articles of the invention, that ignition takes place in a predictable pattern, whereby the edges of the fingers 14 are ignited first, with the initial ignition taking place near the tips 16 of the fingers. At approximately the same time, ignition is observed in hole 20, first at its top or bottom edge, along ridges 30, and finally inside the entire hole surface itself. The ignition gradually spreads to the balance of the top and bottom surfaces 22 and 24, and to the central and base portions of the connecting walls 26 along fingers 14. It is desirable that ignition reach the self-sustaining burning of phase 2 by the time the lighter fluid has been completely dissipated through burning.

Figure 2:
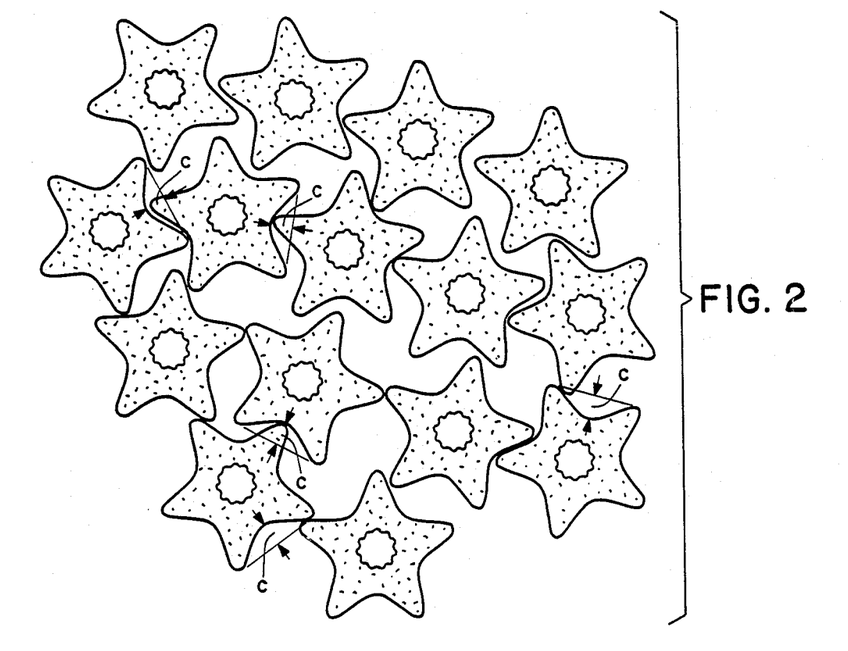
FIG. 2 is a top view of a plurality of charcoal fuel articles of the invention positioned in close formation together in a single layer.

One test of the capability of the fuel articles of the invention to contribute mutually to the ignition of each other is to lay the fuel articles in a single layer, on one of the surfaces 22 or 24, and to put them vigorously but carefully together positioned in a close formation single layer, as seen in FIG. 2. When positioned in close formation configuration as seen in FIG. 2, substantial fractions of the perimeters of the articles are in substantial surface-to-surface contact with each other, along horizontally nested surface portions, in such a way that they cannot be conveniently brought closer to each other, as an overall group combination, without risking damage such as physical breakage to the fuel articles.

Applicants have seen, from experimental observation, that ignition commences at sharp angled surface intersections, namely angles less than about 120°, of a fuel article. Standard pillow-shaped briquettes have sharp angle surface intersections only about the edges of the rectangular perimeter, and do no have significant projections from the body of the fuel article. Surface intersections can be measured in linear dimensions; projections can be measured in either 1 or 2 dimensions. Both can be related to bulk density. Ignition properties of fuel articles of the invention are enhanced, in part, by the substantially greater occurrence of intersections in fuel articles of the invention, and by the ends 16 of projecting fingers 14. Sharp angled surface intersections are on the top and bottom of the fuel articles where surfaces 22 and 24 intersect connecting walls 26 and the walls of hole 20. When ignition is taking place on fuel articles of the invention, it preferentially starts at the surface intersections and the ends 16 of fingers 14. The increased occurrence of intersections and the ends enhances the overall rate of ignition by providing more surface location for starting ignition and reducing the distance between spaced locations where ignition starts, thus reducing the distance for growth of the ignition boundaries on the igniting article before adjacent igniting boundaries meet in completion of ignition of a surface.

It is seen particularly in FIGS. 2 and 3 that the shapes of the illustrated fuel articles of the invention are compatible to nesting portions of the fuel articles with each other, such as a finger end 16 in a concavity "c" between fingers (see FIGS. 1 and 2). Such nesting may be accompanied by closely spaced portions of surfaces, such as walls 26, diverging from nest locations, as seen in FIG. 2. It may also be accompanied by closely spaced parallel or diverging intersections, which are nonetheless proximate each other. Closely spaced means close, but not touching. Some portions of the fuel articles are touching each other in a layer or a random stack as in FIGS. 2 and 3 respectively. Those portions are not included within the meaning of "closely spaced" as they are not "spaced."

Close spacing allows movement of air, as for combustion, between the surface, while creating the enhanced ignition environment where an ignited surface or intersection radiates heat to its closely spaced neighbor, helping to raise its temperature. Two partially ignited adjacent surfaces, with combustion air able to readily pass between them, thus cooperate with each other in enhancing the complete ignition of both surfaces.

The enhanced ignition is further believed to be, in part, a function, not only of the feature of nesting with close spacing; but, in combination with particularly the close spacing, the relationship of bulk density to mass density whereby the bulk density is about 0.2 g/cc to about 0.4 g/cc, and preferably about 0.25 g/cc to about 0.35 g/cc, and most preferably about 0.26 g/cc to about 0.33 g/cc, with significant spacing taking place in all three dimensions of volume, as seen in FIG. 3. The significant spacing in all three dimensions ensures that combustion air can more-or-less circulate freely through a random stack. By comparison, with a random stack of conventional pillow shaped briquettes, the nesting of the pillows is effective to impede flow of air through the stack, such that ignition starts primarily on the outer periphery of the stack. In a random stack of fuel articles of the invention, ignition takes place more or less uniformly throughout the stack, with the exception of the few random places where surfaces 22 and/or 24 are in surface-to-surface contact.

Ignition properties are also enhanced by the capability for air to circulate freely in three dimensions in combination with the increased area of surface intersections and projection ends. Surface intersection is defined to include intersections and projection ends, and particularly to include the surface areas adjacent the line of intersection, such as, for calculation purposes herein, within about $\frac{1}{8}$ inch of the line of intersection. The line of intersection may be represented by a rounded surface with a minor radius of 0.25 inch or less, preferably 0.125 inch or less, but up to 0.50 inch at projection ends. Where the intersection is a rounded surface, the area of intersection surface is measured from the line on the rounded surface and defined by a plane passing through the projected line of intersection and perpendicularly through the rounded surface. The individual fuel articles preferably have a ratio of area of surface intersections to volume of the article of about 0.8 in$^2$/in$^3$ to about 2.0 in$^2$/in$^3$. The volume of the individual fuel article includes the volume of the hole 20, if present.

FIG. 2 represents the fuel articles of the invention as having substantial fractions of their perimeters with substantially nested portions between adjacent fuel articles, where the nesting is imperfect. It is this imperfection in the nesting that allows air to circulate vertically through the nest area without major impedance. It is seen that, in the depiction of FIG. 2, there are small spaces between the articles where they could be more closely and more compactly arranged. This is done in the illustration for the purpose of keeping the defined outlines of the articles visible, it being understood that, in a complete positioning in close formation arrangement, the articles are touching each other and are in intimate contact. The purpose of he positioning in close formation test is to facilitate calculating the fraction of the vertical projection of the positioning in close formation arrangement which is not overlain by the fuel articles. This area, which includes the area between the articles, and the area in the holes, is known as the void projection, and is represented as a fraction of the overall area covered by the arrangement of fuel articles. It has been found that if the percent void of the vertical projection is at least about 5%, the ignition properties of the fuel articles are enhanced over the ignition properties of standard pillow-shaped briquettes. It is preferred that the projection be at least about 10% void, with the most preferred void fraction being on the order of about 12 to about 16 percent. Toward the lower end of the void fraction range, normally in the 5 to 10 percent region, the ignition properties are enhanced somewhat, but not so much as with those articles where the void fraction is in the preferred range. If the percent void exceeds the most preferred range of about 20 percent, the cross-sections of the fuel articles tend to be so thin that the fuel may be consumed before the typical cooking operation is completed; so void percentages over 20% are not preferred. The overall void percent of fuel articles of the invention, then, is between about 5 percent and about 20 percent, with the most preferred range being about 12 percent to about 16 percent. While the fuel articles are not typically ignited or used in the arrangement seen in FIG. 2, though they can be, this arrangement is illustrated for the purpose of identifying the void fraction as a preferred characteristic of the fuel articles of the invention.

Figure 4:
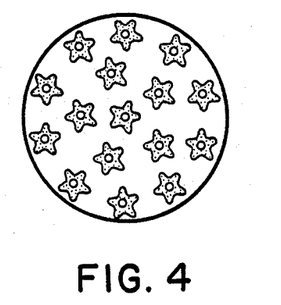
FIG. 4 is a top view of a plurality of charcoal fuel articles as they are arranged for normal cooking in a standard charcoal cooker after completion of the ignition phase.

When the fuel articles of the invention have been satisfactorily ignited in some fashion, whether in a random stack, in a chimney starter, or in some other fashion, the fuel articles are preferably arranged in a spaced apart configuration, with each fuel article having its bottom 24 and its top 22 oriented downwardly and upwardly, respectively. The spaced apart configuration is seen in FIG. 4. It should be understood that each fuel article has two surfaces 22 and 24 which may be used interchangeably. The top in one orientation may become the bottom in another orientation without detracting from the article or its use. The FIG. 4A prior art illustration indicates a similar usage of conventional pillow-shaped briquettes, where the briquettes are typically spaced quite closely together, and in some cases in intimate contact. It has been found that such close arrangement of the fuel articles of the invention, as is conventional for conventional briquettes as in FIG. 4A, leads to a heat so high that the food may be scorched or burned. Such scorching and burning is readily avoided by the spaced apart arrangement of the fuel articles as shown in FIG. 4. A substantial benefit of the fuel articles of the invention is that the required amount of heat may be generated using substantially less fuel, by weight typically 20% to 30% less fuel. This has substantial implication in terms of the economy of use of the fuel articles of the invention, even though the fuel composition of the fuel articles of the invention does not depart drastically from the typical compositions of conventional pillow-shaped briquettes.

A surprising feature of the invention is that the fuel articles described herein are capable of sustaining a typical burn, with sufficient heat for normal cooking, following ignition, in the spaced apart configuration seen in FIG. 4. In a similar spaced apart arrangement, not shown, of pillow-shaped briquettes, where each star in FIG. 4 is replaced by a conventional ignited briquette, the heat reaching the cooking surface is insufficient for normal cooking. It is believed that the substantial surface area of the connecting walls 26 may be responsible for directing radiant heat among the several articles in order to mutually support the combustion of adjacent fuel articles. And while that function is believed to be contributory to the efficient and thorough burning of the fuel articles, it is believed that a more significant factor in the satisfactory burning of the fuel articles is in hole 20, as, upon ignition of the hole 20, which normally takes place in the ignition cycle, or shortly thereafter, the hole typically takes on a temperature of its own which is higher, as evidenced by the color of the radiant glow coming from the hole, than most other areas of the burning fuel article, particularly when it is spaced from other burning fuel articles. Thus, the complete ignition of the hole 20 itself, is sufficient to ensure that the fuel articles of the invention will burn until the fuel has been completely consumed.

Figure 5:
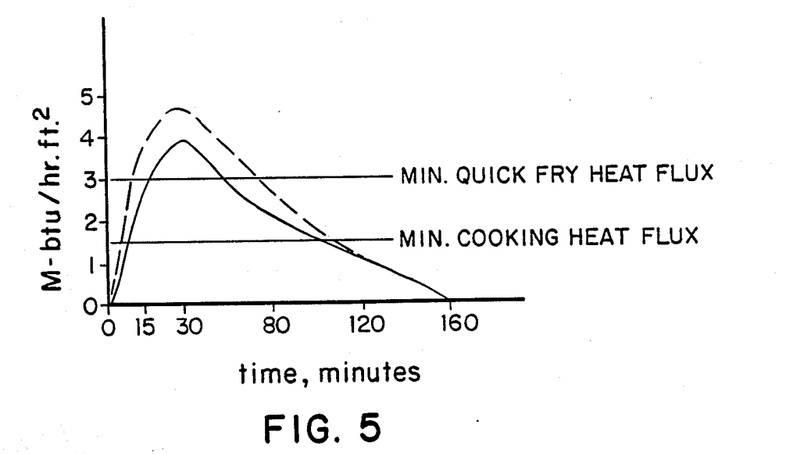
FIG. 5 is a chart showing the heat output from a typical amount of conventional charcoal throughout its ignition and burn phase, and a corresponding representation for an equivalent mass of charcoal fuel articles of this invention.

Returning again to a discussion of the ignition of the fuel articles of the invention, and the heat output from them, comparative results from ignition tests are seen in FIG. 5. The solid line in FIG. 5 indicates the heat output of conventional charcoal briquettes, during the ignition phase and through the completion of the burn, until the fuel is completely consumed. The dashed line represents the same process for an equivalent mass of fuel articles of the invention. It is seen from FIG. 5 that the fuel articles of the invention reach their maximum heat output substantially sooner than conventional briquettes. The maximum heat output is also greater. Finally, they deliver a substantially greater amount of usable heat, as measured by the integration of the areas under the two curves, above threshold heat output necessary for cooking i.e. at least 1500 Btu/ft$^2$-hr. Quick frying requires above about 3000 Btu/ft$^2$-hr.

The data for generating FIG. 5 was obtained by making parallel tests with convention pillow-shaped briquettes manufactured by a leading producer, namely Kingsford Company of Oakland, Calif., and the fuel articles of the invention illustrated herein. In the tests, the fuel articles of the invention, and the conventional briquettes, were treated with the amount of igniter fluid recommended by Kingsford, namely 4 ounces of fluid per 4 pounds of charcoal. Both were then arranged in random stacks for ignition on the combustion grates of conventional 22 inch charcoal cookers, as manufactured by Weber-Stephen Products Company of Palatine, Ill. It was first observed that the red glow, and the to grey ash both characteristic of ignition of the charcoal, appeared substantially sooner and over an initially larger area, on fuel articles of the invention, than on the conventional briquettes. Once the ignition phase had been completed, the groups of the fuel articles were arranged in single layers for the cooking phase. Heat output throughout the test was measured at the surface of the cooking grate of the charcoal cooker. The overall result of the tests represented by FIG. 5 is that the fuel articles of the invention ignited faster, reached cooking heat flux sooner, and delivered a greater overall amount of usable cooking heat then an equivalent mass of conventional briquettes. There are minor compositional differences between the conventional briquettes and the fuel articles of the invention used in this test, which was the preferred composition shown in Table 1 hereinafter. The compositional differences are insignificant with respect to heat output, and similar test results would be obtained where the compositions are the same.

The term "cooking temperature" is measured at the cooking surface, typically the cooking grate, and is defined as that temperature which is typically satisfactory for normal cooking of food in a charcoal cooker.

The fuel articles of the invention perform better than prior art fuel articles primarily as a result of their shape and their surface characteristics, which promote improved ignition and improved burn characteristics. The ignition and burn characteristics are influenced by a number of characteristics of the fuel article shape. One improvement in the fuel article shape is the provision of substantially more surface area than in a conventional charcoal briquette. This may be defined by relating the surface area to the volume of the fuel article. The surface area is that represented by the overall surface of the article on all surfaces on a macro scale. The volume is that volume increase which would be observed by immersing the article in a liquid contained in a container and measuring the instantaneous volume displacement. Surface to volume ratio is about 2.5:1 to about 7.0:1 and preferably about 3:1 to about 6:1, and most preferably about 3.5:1 to about 5:1. If the ratio is less than about 2.5, ignition characteristics are less than preferred for use in the invention. As the ratio increases over about 7.0, the time to completion of burn of fuel articles is typically shorter than desired for the intended purpose of cooking.

The improved shape of fuel articles of the invention tends to promote spacing in a random stack such that air circulates freely to essentially all surfaces of the fuel articles, except for minimal contact points, and without substantial nesting.

Figure 4A:
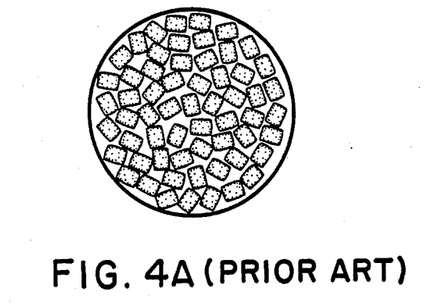
FIG. 4A represents a view as in FIG. 4 of a similar arrangement of prior art pillow-shaped charcoal briquettes.

An advantage of the fuel articles of the invention resides directly in the heat generated in hole 20. Upon completion of ignition of a fuel article of the invention, the hole 20 takes on a brighter color than the remainder of the fuel article, and than virtually any portion of the conventional pillow-shaped briquettes as shown in FIG. 4A. This is indicative that hole 20 reaches a higher burning temperature than the typical charcoal briquette and the balance of the fuel article. This higher temperature contributes substantially to the energy emitted from the fuel article, and from the plane of fuel articles as described herein above.

The top and bottom surfaces 22 and 24 are typically irregular, as they are formed through a separation type process. As will be seen hereinafter in the discussion of the preferred method of manufacture of the articles of the invention, the surfaces 22 and 24 may include surface fractures or other surface irregularities, all part of the desired surface characteristics and reflecting the method of manufacture.

In use of fuel articles of the invention it is highly advantageous that air be able to flow upwardly through the fuel, and particularly through hole 20, in order to achieve the preferred burning characteristics of the fuel articles of the invention. Therefore it is preferred that the fuel articles be used with a combustion grate as is available in the standard charcoal cooker which promotes the desired patterns of air flow. The fuel articles may be used with cookers that do not have a combustion grate, but without necessarily receiving the benefits attendant the improved shape of the fuel articles of this invention.

With respect to the desired air flow, it is seen that air flowing upwardly past the fuel article illustrated in FIG. 1 may be in general contact with vertical sidewalls 26 for a linear distance "h" equivalent to substantially the entire thickness of the fuel article. To the extent heat of combustion is being generated in the lower regions of sidewalls 26, conductive and convective heat are progressively transferred to the air along the distance "h", providing a certain combination of distance and time to conductively and collectively raise the temperature of air and other gases rising through and from the burning charcoal. In conventional charcoal briquettes, the height of equivalent vertical sidewalls is essentially a line "h1A" as seen in FIG. 1A, having a comparatively small vertical dimension. As such, any building of temperature of the rising air and gases by conduction and convection is dependant on flow of gases in a non-straight line fashion.

For using the fuel articles of the invention, it is preferred to reduce the mass quantity of the fuel used as compared to the recommended quantity of conventional pillow-shaped briquettes. The appropriate quantity of fuel depends on the cooker size and will vary accordingly. Thus, while the desired quantity of fuel is illustrated in FIG. 4 for a typical 22 inch charcoal cooker, less fuel articles would be used for a smaller cooker, and more articles would be used for a larger cooker. A typical quantity of fuel articles of the invention used with a standard 22 inch cooker, is 3 lbs of fuel, and 4 ounces of lighter fluid. With conventional charcoal briquettes, the equivalent typical amounts are 4 lbs of fuel and 4 ounces of lighter fluid.

In the preferred embodiment of the fuel articles of the invention, the diameter of the major circumference 18 is about 2.5 to about 4.0 inches, the diameter of the minor circumference 12 is about 1.5 to about 2.5 inches, and the diameter of hole 20 is about 0.375 to about 1 inch. Preferred height "h" of the article is on the order of about 1 to about 2 inches.

Another way of characterizing the fuel articles of the invention is to relate the height "h" of the fuel article to the greatest distance, dg, from a point in the fuel article to the nearest point on the nearest upstanding wall, namely connecting walls 26, or one of the surface areas in hole 20. Preferably the distance, dg, is between about 0.18 h and about 0.63 h. To the extent the distance, dg, is less than about 0.18 h, the fuel article generally does not have an extended burning time desired for cooking food. To the extent that the distance, dg, is greater than about 0.63 h, there is typically insufficient surface area over the extended period of burn of the fuel article to maintain the desired cooking temperature in the spaced apart configuration.

It is preferred that dg not be greater than about 0.63 inch. Distances greater than 0.63 inch tend to contribute to article shapes and sizes which are not preferred. Similarly, a dg less than about 0.18 inch typically represents fuel articles that do not have extended burning time characteristics; so a minimum distance for dg is specified, in some embodiments, as about 0.18 inch.

Another way of characterizing the fuel articles of the invention is by describing the relationship between the major circumference 18 as defined at the finger ends 16 and the minor circumference 12 as defined at the outer perimeter of the central body portion, which corresponds with the base of fingers 14. The ratio of the major circumference to the minor circumference is between about 1.25:1 and about 2.3:1. Preferred ratio is greater than about 1.5:1 and less than about 2.0:1; and most preferred ratio is about 1.6:1 to about 1.8:1. On the lower end of the ratio, the length of fingers 14 becomes quite short, such that the contribution of finger dimensions to low bulk density, which is so desirable for air flow characteristics in a stack being ignited is reduced. Also the fingers may be consumed before the consumption of the balance of the fuel article, thus changing the overall outline of the article during the general burning phase, and thus the characteristic pattern of heat delivered to the cooking surface; whereas uniformity of such pattern is preferred. The larger ratios provide fuel articles having longer fingers, which are more fragile, and more easily broken, without substantial benefits being derived from those longer fingers. Thus, the finger length contributes not only to the ignition characteristics but also to the characteristics of use, particularly to the amount and distribution of radiant heat delivered to the cooking grate during the general burn phase.

The charcoal fuel articles of the invention may be made using a variety of charcoal fuel compositions. Charcoal compositions especially contemplated as functional within the context of the invention are all compositions commonly represented as charcoal, but not those compositions made from essentially 100% unpyrolyzed coal. Substantial fractions of unpyrolyzed coal may be used as part of the composition. But some reduction in ignition properties does attend such compositions, so preferred compositions contain no more than about 50% unpyrolyzed coal.

The charcoal used in compositions of the invention may be that derived from any of a variety of sources, especially wood, coal, petroleum, and the like. The charcoal is generated in the usual method, namely heating the source material in a low-oxygen environment. Typical of fuel compositions contemplated for this invention are those indicated in Table 1, on a dry basis.

TABLE 1

| Component | Typical Compositions Typical Percentage Range | Preferred Composition |
|---|---|---|
| Charcoal | 64–96% | 82% |
| Starch | 4–10% | 7% |
| Sawdust | 0–20% | 8% |
| Borax | 0–1% | .2% |
| Sodium Nitrate | 0–5% | 3% |

The fuel articles of the invention are typically formed with a moisture content of about 25% to about 40% water, preferably about 30% to about 35%.

The fuel articles of the invention are formed in an extrusion process. The components of the composition are first reduced in size and mixed together by standard milling and mixing equipment. The moisture is adjusted as appropriate for extrusion purposes. The fuel articles may be extruded using a conventional extruder and an appropriately shaped die to generate the shape having the projecting fingers 14 and the hole 20. As the extruded shape exits the extruder die, and at the desired frequency, a knife cuts the extrudate to form the individual articles 10. The height "h" of the articles is readily controlled by the timing of the cutting operation in relationship with the speed of emergence of the extruded shape. Thus a shorter height "h" may be obtained by a more frequent cutting action and a taller height "h" may be obtained by a less frequent cutting action. The same result may be obtained by changing the speed of emergence of the extrudate from the extrusion die. It is highly preferred, for fuel articles of the invention, that the frequency of the cutting be such that the height "h" is substantially less than the diameter of the circle defined by major circumference 18. The diameter of the circle defined by circumference 18 is the cross-section dimension of the fuel article. To the extent the height to cross-section ratio is greater than 1:1, the period of burning of the fuel articles will be substantially greater than is typically preferred for cooking type processes when cooking as for a single family. Such thicker articles may be acceptable where extended cooking times are anticipated, as for commercial cooking operations. Height to cross-section ratios as high as about 1.5:1 are contemplated, as for this purpose, as part of the invention, although they are not normally preferred.

It is desirable that the extrusion take place in equipment that is substantially smooth, as this is beneficial to efficiency of the extrusion operation. Smooth machined contours are acceptable in the extrusion equipment. The forming walls 26 and the surfaces of hole 20 are generally in contact with smooth die surfaces as they are being formed. The smooth dye surfaces generally form smooth, and rather nonporous surfaces 26, 28, and 30. Top and bottom surfaces 22 and 24 are formed by a cutting action, or other separation means which leaves a relatively rough and porous surface, reflecting the separation process. The cutting action typically contemplated herein for formation of surfaces 22 and 24 is the separating of the individual fuel articles from the emerging extrudate. The resulting surface is generally porous, and often has a plurality of fractures in it which are believed to have been generated in the separation process. Other means of separating the fuel article from the emerging extrudate are contemplated as being feasible, and would result in the same porous type surface.

At the point the fuel article is separated from the emerging extrudate, its moisture content of between 30% and 35% makes it rather plastic. The newly formed fuel articles are then passed through a conventional oven for drying to the typical equilibrated moisture content of 5% more or less. In the drying operation the increased porosity of the surfaces 22 and 24, which constitute a major fraction of the surface area of the fuel article, facilitates faster drying rates through surfaces 22 and 24 as compared to the compression molded surfaces of pillow-shaped conventional charcoal briquettes.

It is preferred that fuel articles of the invention have surfaces which have substantial porosity or irregularity, while still generally defining desirable surface shape. These surface characteristics are most conveniently achieved during manufacture of the fuel articles. With respect to walls 26, such achievement is difficult because of the desired smoothness of die surfaces to facilitate the extrusion process. Desired surface characteristics of top and bottom walls 22 and 24 may be achieved by control of the process as the extrudate leaves the die. One way of achieving these surface characteristics with the process is by controlling the moisture content of the material being extruded and adjusting the orientation or configuration of, for example, the knife used for separating individual fuel articles from the extrudate. Another way of achieving the desired surface characteristics is by controlling the composition of the material being extruded such that it contains at least about 1% by volume particles greater than about 0.06 inch in cross-section. If separation occurs as by pulling the individual fuel article away from the extrudate mass, as by tearing, each larger particle will either go in toto with the separating article or will stay in toto with the extrudate mass. In either case, particles at the surface of separation tend to create a projection on one of the surfaces and a depression on the other, such that both surfaces receive surface irregularities. If the separation process occurs by cutting, some of the larger particles impacted as by a cutting blade are dragged by the cutting blade along the direction of the cut, creating a furrow, another type of surface irregularity, in one or both of the surfaces being formed. Such surface irregularities are typically accompanied by surface porosity about the irregularity where conventional charcoal processing moistures are present.

Thus, it is seen that the charcoal fuel articles of the invention provide a substantial number of benefits over conventional pillow-shaped briquettes.

These include ease of ignition as compared to other charcoal fuel articles, in combination with the sustained burn characteristics of charcoal. Unpyrolyzed wood is not used as the primary fuel component in fuel articles of the invention for cooking food, as it has an undesirably shorter burn time, though smaller amounts of wood shavings or sawdust may be used as illustrated in Table 1. Nonetheless, the improvements in shape of charcoal fuel articles disclosed and described herein may be applied to other fuel compositions such as coal compositions, with attendant improvements in ignition, burn, and heat delivery characteristics, as in the charcoal fuel articles described herein, and as modified in accordance with the burning characteristics of the specific compositions used.

The fuel articles of the invention have thus been described in detail for one embodiment. It is contemplated that substantial variations may be made from the shape and compositions of the illustrated embodiment without departing from the spirit of the invention. Thus it is desired that the scope of the patent be defined not only by the embodiment illustrated herein, but rather by the scope of the appended claims.

What is claimed is:

1. A charcoal fuel article having a mass density, md, of about 0.6 g/cc to about 1.2 g/cc and a bulk density, in a random stack of said articles, of about 0.2 g/cc, said fuel article comprising a central body portion having a minor circumference, a plurality of fingers projecting from said central body portion, and including a hole through said central body portion, said charcoal fuel article being functional to retain recited shape during ignition and burning.

2. The charcoal fuel article as in claim 1, a given mass of said fuel articles being capable of delivering substantially longer cooking temperature to the cooking surface of a standard charcoal cooker than an equivalent mass of standard pillow-shaped charcoal briquettes having the same composition.

3. The charcoal fuel article as in claim 1, a random stack of said articles, when ignited by standard ignition techniques, reaching cooking temperature substantially sooner than an equivalent random stack of standard pillow-shaped charcoal briquettes having the same composition.

4. The charcoal fuel article as in claim 2, a random stack of said articles, when ignited by standard ignition techniques, reaching cooking temperature substantially sooner than an equivalent random stack of standard pillow-shaped charcoal briquettes having the same composition.

5. The charcoal fuel article as in claim 2 wherein, in a single layer of said articles scrunched together, substantial fractions of the perimeters of said articles are in substantially surface-to-surface proximity with each other along substantially nested adjacent surfaces thereof.

6. The charcoal fuel article as in claim 2, said fuel article having a ratio of surface area to volume of between about 2.5:1 and about 7.0:1.

7. The charcoal fuel article as in claim 2, said charcoal fuel article having a normal orientation position, and including top and bottom surfaces, said top and bottom surfaces reflecting having been made by a separation process.

8. The charcoal fuel article as in claim 3, said fingers having finger ends defining a major circumference, the ratio of said major circumference to said minor circumference being at least about 1.25:1.

9. The charcoal fuel article as in claim 3 wherein, in a single layer of said articles scrunched together, substantial fractions of the perimeters of said articles are in substantial surface-to-surface proximity with each other along substantially nested adjacent surfaces thereof.

10. The charcoal fuel article as in claim 3, said charcoal fuel article having a ratio of surface area to volume of between about 2.5:1 and about 7.0:1.

11. The charcoal fuel article as in claim 3, said charcoal fuel article having a normal orientation position, and top and bottom surface said top and bottom surfaces reflecting having been made by a separation process.

12. The charcoal fuel article as in claim 1, said fingers having finger ends defining a major circumference, the ratio of said major circumference to said minor circumference being at least about 1.25:1.

13. The charcoal fuel article as in claim 12, said ratio being about 1.25:1 to about 2.3:1.

14. The charcoal fuel article as in claim 13, said ratio being about 1.5:1 to about 2.6:1.

15. The charcoal fuel article as in claim 14, said ratio being about 1.6:1 to about 1.8:1.

16. The charcoal fuel article as in claim 11 wherein, in a single layer of said articles scrunched together, substantial fractions of the perimeters of said articles are in substantial surface-to-surface proximity with each other along substantially nested adjacent surfaces thereof.

17. The charcoal fuel article as in claim 12 wherein, in a single layer of said articles scrunched together, substantial fractions of the perimeters of said articles are in substantial surface-to-surface proximity with each other along substantially nested adjacent surfaces thereof.

18. The charcoal fuel article as in claim 11, said charcoal fuel article having a ratio of surface area to volume of between about 2.5:1 and about 7.0:1.

19. The charcoal fuel article as in claim 18, said ratio being about 3.1 to about 6:1.

20. The charcoal fuel article as in claim 19, said ratio being about 3.5:1 to about 5.0:1.

21. The charcoal fuel article as in claim 1, said charcoal fuel article having a normal orientation position, and including top and bottom surfaces, said top and bottom surfaces reflecting having been made by a separation process.

22. The charcoal fuel article as in claim 1, said charcoal fuel article having a height "h", and substantially upstanding walls, said fingers and said hole being defined by substantially upstanding side walls, and charcoal fuel article having a height to cross-section ratio of no more than about 1:1, the greatest distance, dg, from a point in said fuel article to the nearest point on the nearest upstanding wall ranging from about 0.18 inch to about 0.63 inch.

23. The charcoal fuel article as in claim 22, said hole walls including a plurality of channels and ridges.

24. The charcoal fuel article as in claim 23, said charcoal fuel article being in the shape of a star.

25. The charcoal fuel article as in claim 22, a random stack of said articles, when ignited by standard ignition techniques, reaching cooking output of heat flux sooner than an equivalent mass random stack of standard pillow-shaped charcoal briquettes having the same composition.

26. The charcoal fuel article as in claim 25, said fingers having finger ends defining a major circumference, the ratio of said major circumference to said minor circumference being at least about 1.25:1.

27. The charcoal fuel article as in claim 25 wherein, in a single layer of said articles scrunched together, substantial fractions of the perimeters of said articles are in substantial surface-to-surface proximity with each other along substantially nested adjacent surfaces thereof.

28. The charcoal fuel article as in claim 25, said charcoal fuel article having a ratio of surface area to volume of between about 2.5:1 and about 7.0:1.

29. The charcoal fuel article as in claim 22, said fingers having finger ends defining a major circumference, the ratio of said major circumference to said minor circumference being at least about 1.25:1.

30. The charcoal fuel article as in claim 22 wherein, in a single layer of said articles positioned in close formation together, substantial fractions of the perimeters of said articles are in substantial surface-to-surface proximity with each other along substantially nested adjacent surfaces thereof.

31. The charcoal fuel article as in claim 22, said charcoal fuel article having a ratio of surface area to volume of between about 2.5:1 and about 7.0:1.

32. The charcoal fuel article as in claim 22, said charcoal fuel article having top and bottom surfaces, said top and bottom surfaces reflecting having been made by a separation process.

33. A charcoal fuel article as in claim 1 having a height to cross-section ratio of less than about 1:1.

34. The charcoal fuel article as in claim 22, a given mass of said fuel articles being capable of delivering substantially more usable cooking heat flux to the cooking surface of a standard charcoal cooker than an equivalent mass of standard pillow-shaped charcoal briquettes having the same composition.

35. The charcoal fuel article as in claim 22, said charcoal fuel article having a normal orientation position on a flat surface, the configuration of said article being such that the vertical projection of a single layer of said articles positioned in close formation together, in their normal positions, is at least about 5 percent void.

36. The charcoal fuel article as in claim 35 wherein, in a single layer of said articles positioned in close formation together, substantial fractions of the perimeters of said articles are in substantial surface-to-surface proximity with each other along substantially nested adjacent surfaces thereof.

37. The charcoal fuel article as in claim 35, said charcoal fuel article having a ratio of surface area to volume of between about 2.5:1 and about 7.0:1.

38. A charcoal fuel article having a mass density, md, of about 0.6 g/cc to about 1.2 g/cc and a bulk density of about 0.2 g/cc to about 0.4 g/cc, said fuel article comprising a central body portion having a minor circumference, a plurality of fingers projecting from said central body portion and including a hole through said central body portion, said fuel article has normal orientation position said fingers and hole being defined by side walls which are substantially upstanding when said fuel article is in said normal orientation position, the configuration of said article being such that the vertical projection of a single layer of said articles positioned in close formation together in the normal position void.

39. The charcoal fuel article as in claim 38, said fingers having finger ends defining a major circumference, the ratio of said major circumference to said minor circumference being at least about 1.25:1.

40. The charcoal fuel article as in claim 38 wherein, in a single layer of said articles positioned in close formation together, substantial fractions of the perimeters of said articles are in substantial surface-to-surface proximity with each other along substantially nested adjacent surfaces thereof.

41. The charcoal fuel article as in claim 38, said charcoal fuel article having a ratio of surface area to volume of between about 2.5:1 and about 7.0:1.

42. The charcoal fuel article as in claim 38, said top and bottom surfaces reflecting having been made by a separation process.

43. The charcoal fuel article as in claim 3 wherein the composition of said charcoal fuel article comprises at least 1 percent by volume particles greater than about 0.06 inch in cross-section.

44. The charcoal fuel article as in claim 1 wherein the composition of said charcoal fuel article comprises at least about 1 percent by volume particles greater than about 0.06 inch in cross-section.

45. The charcoal fuel article as in claim 2 wherein the composition of said charcoal fuel article comprises at least about 1 percent by volume particles greater than about 0.06 inch in cross-section.

46. The charcoal fuel article as in claim 22 wherein the composition of said fuel article comprises at least about 1 percent by volume particles greater than about 0.06 inch cross-section.

47. The charcoal fuel article as in claim 38 wherein the composition of said charcoal fuel article comprises at least about 1 percent by volume particles greater than about 0.06 mil in cross-section.

48. A charcoal fuel article having a mass density, md, of about 0.6 g/cc to about 1.2 g/cc and a bulk density, in a random stack of said articles, of about 0.2 g/cc to about 0.4 g/cc, said fuel article comprising a central body portion having a minor circumference, a plurality of fingers projecting from said central body portion, and including a hole through said central body portion, said fuel article having between about 0.8 and about 2.0 square inches of surface intersection area per cubic inch volume of said fuel article, a random stack of said charcoal fuel articles, when ignited by standard charcoal ignition techniques, reaching cooking output of heat flux sooner than an equivalent mass random stack of standard pillow-shaped charcoal having the same composition.

49. The charcoal fuel article as in claim 48, said fuel article having a mass density md of about 0.7 g/cc to about 0.85 g/cc and a bulk density of about 0.25 g/cc to about 0.33 g/cc.

50. The charcoal fuel article as in claim 49, said fuel article having a mass density of about 0.7 to about 0.9.

51. The charcoal fuel article as in claim 48, said article having a height "h", said fingers and hole being defined by upstanding side walls, the greatest distance dg from a point in said fuel article to the nearest point on the nearest one of said upstanding walls ranging from about 0.18 inch to about 0.63 inch.

52. The charcoal fuel article as in claim 48, said fuel article having a height to cross-section ratio of less than about 1:1.

53. The charcoal fuel article as in claim 48, each of said fuel articles having a normal orientation position, said fingers and hole being defined by side walls which are substantially upstanding when said fuel article is in said normal position, the configuration of said article being such that the vertical projection of a single layer of said articles positioned in close formation together in the normal position is at least about 5 percent void.

54. The charcoal fuel article as in claim 48, said fingers having finger ends defining a major circumference, the ratio of said major circumference to said minor circumference being at least about 1.25:1.

55. The charcoal fuel article as in claim 54 wherein, in a single layer of said fuel articles positioned in close formation together, substantial fractions of the perimeter of said articles are in substantial surface-to-surface proximity with each other along substantially nested adjacent surfaces thereof.

56. The charcoal fuel article as in claim 48, said article having a ratio of overall surface area to volume of between about 2.5:1 and about 7.0:1.

57. The charcoal fuel article as in claim 48, said fuel article comprising opposing top and bottom surfaces and a plurality of connecting side walls and intersecting said top and bottom surfaces at sharp angles.

58. The charcoal fuel article as in claim 48, said top and bottom surfaces reflecting having been made by a separation process.

59. The charcoal fuel article as in claim 1, said charcoal fuel article having a height, said height to cross-section ratio being as high as about 1.5:1.

60. The charcoal fuel article as in claim 53, said charcoal fuel article having a ratio of surface area to volume of between about 4.5/1 and about 7.0/1.

61. The charcoal fuel article as in claim 60, said fingers having finger ends defining a major circumference, the ratio of said major circumference to said minor circumference being at least about 1.25:1.

62. The charcoal fuel article as in claim 61, said fuel article having top and bottom surfaces, said surfaces having been made by a separation process.

63. The charcoal fuel article as in claim 53, said fingers having finger ends defining a major circumference, the ratio of said major circumference to said minor circumference being at least about 1.25:1.

64. The charcoal fuel article as in claim 63, said charcoal fuel article having top and bottom surfaces, said top and bottom surfaces having been made by a separation process.

65. The charcoal fuel article as in claim 38 wherein said vertical projection is at least about 10% void.

66. The charcoal fuel article as in claim 53 wherein said vertical projection is at least about 10% void.

67. The charcoal fuel article as in claim 65 wherein said vertical projection is not over 20% void.

68. The charcoal fuel article as in claim 65 wherein said vertical projection is about 12 to about 16% void.

* * * * *